(No Model.)

S. J. ROSE.
WHEEL TIRE.

No. 459,335. Patented Sept. 8, 1891.

WITNESSES:
G. S. Clark
J. E. Ball

INVENTOR
Stephen J. Rose
by Robt.6. A. Phillips.
ATTORNEY.

THE NORRIS PETERS CO., PHOTO-LITHO., WASHINGTON, D. C.

UNITED STATES PATENT OFFICE.

STEPHEN J. ROSE, OF WITNEY, ENGLAND.

WHEEL-TIRE.

SPECIFICATION forming part of Letters Patent No. 459,335, dated September 8, 1891.

Application filed June 16, 1891. Serial No. 396,530. (No model.)

*To all whom it may concern:*

Be it known that I, STEPHEN J. ROSE, a subject of the Queen of Great Britain, residing at Witney, in the county of Oxford, England, have invented a new and useful Improvement in Wheels for Velocipedes and other Road-Vehicles, of which the following is a specification.

My invention relates to the wheels of velocipedes and other road-vehicles; and it consists of an improved elastic tire, the object being to increase the resiliency or "springback" of the said tire.

Figure 1:
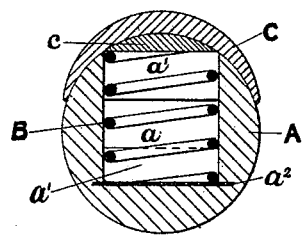
Figure 2:
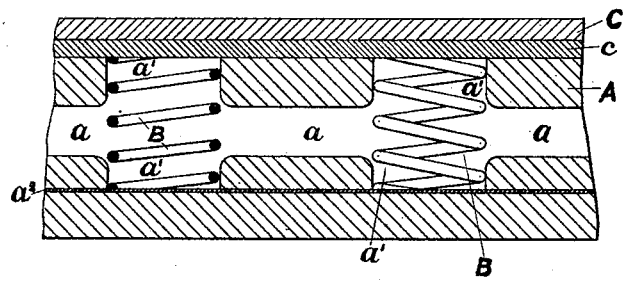
Figure 5:
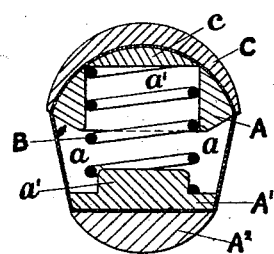
Figure 6:
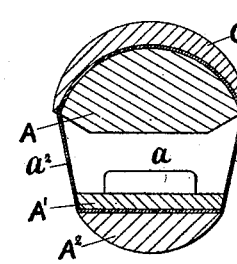
Figure 7:
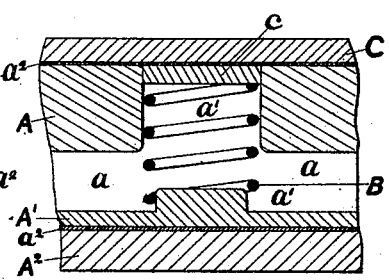
Figure 3:
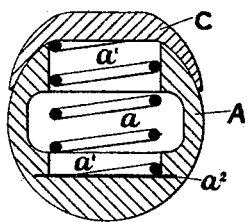
Figure 4:
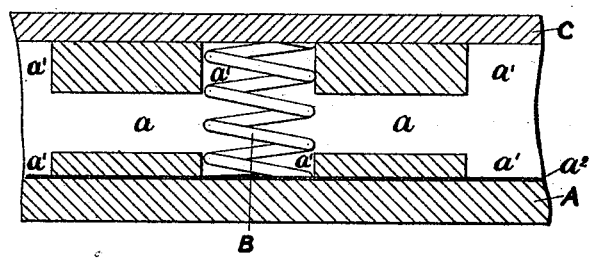

In the drawings which serve to illustrate my invention, Figure 1 is a view in cross-section, and Fig. 2 a broken view in longitudinal section, of my improved tire. Figs. 3 and 4 are views in cross-section and longitudinal section, respectively, of another form my invention may assume; and Figs. 5, 6, and 7 are views showing a further modification of my invention.

Throughout the several views similar parts are marked with the letters of reference.

Referring to Figs. 1 and 2 of the accompanying drawings, A designates the rubber tire, preferably having a circular exterior shape and having a longitudinal hole $a$ running through it. At frequent and fixed intervals round the tire are formed pockets $a'$, adapted to receive spiral springs B, the strength of which is determined by the weight the wheel will be called upon to bear. In the tire A during its construction is placed a strip of canvas $a^2$, adapted to form the bases of the pockets $a$ and to re-enforce the rubber, and so equalize the pressure of the springs on the outer face of the tire. To give the springs a flat bearing-surface in the rim C, I fix thereto a strip $c$, which may be made of common rubber, vulcanite, or any other suitable material, or the rim itself may be shaped to give the required flat surface, as shown by Figs. 3 and 4, in which case the strip $c$ is dispensed with.

In order to obtain the best results from the springs B, it is necessary to provide ample interior hollow space in the tire A for the displacement of the rubber under compression, and to this end I sometimes make the longitudinal hole $a$ of a greater width than the pockets $a'$, as shown by Fig. 3, thus reducing the side walls of the tire to a minimum.

Instead of making the tire A of one piece of rubber, it may, if desired for convenience in construction, be made of two or more pieces. Figs. 5, 6, and 7 show a tire so constructed, Fig. 5 being a cross-section through one of the pockets in the tire, Fig. 6 a cross-section through the other parts of the tire, and Fig. 7 a broken view in longitudinal elevation. This tire is made up of three pieces of rubber A A' A², vulcanized onto a strip of canvas $a^2$, by which they are held together in their proper positions to form the tire. In the base A of the tire, adapted to fit in the rim C, are formed the pockets $a'$ to receive the springs B, and on the outer part A' of the tire are formed small projections $a'$, adapted to fit within the springs B and so guide them and act in an equivalent manner to the pockets. The cushioning-space or longitudinal hole $a$ is formed by and between the two parts A and A' of the tire. The third part A² of the tire is the outer part or tread, and this may, if desired, be made of leather or any other hard-wearing substance. To provide a flat surface for the springs B to bed against, insertion-pieces $c$ are attached to the canvas $a^2$, which are adapted to close the top of the pockets $a'$ and so provide a flat bearing-surface for the springs. It will be seen that by removing the elastic tire from the rim of the wheel, to which it is affixed by cement in the usual manner, the springs can be readily and easily removed from the tire either for the purpose of substituting stronger or weaker ones or for the purpose of replacing broken ones.

I am aware that it is not broadly new to combine metallic springs with rubber to form an elastic tire, and I therefore do not claim such as my invention; but,

Having now fully described my invention, what I desire to claim by Letters Patent is—

1. In a wheel for velocipedes and other road-vehicles, the combination, with the wheel-rim, of a rubber tire, of circular or approximately circular exterior form, having a continuous longitudinal hole running through it and having radial pockets formed at frequent and fixed intervals, as set forth.

2. In a wheel for velocipedes and other road-vehicles, the combination, with the wheel-rim, of a rubber tire having a longitudinal hole running through it and radial pockets formed therein, and a strip laid in the bottom of the rim to present a flat surface to the open mouths of the pockets in the tire, as set forth.

3. The combination, with a wheel-rim made of a partially-flat section, of a rubber tire, D-shaped in cross-section, having radial pockets formed at intervals throughout its length, and a continuous longitudinal hole of a greater width than the said pockets, as set forth.

4. The combination, with a wheel-rim, of a rubber tire having a longitudinal hole running through it and radial pockets formed therein, and a strip of canvas inserted in the rubber tire during its manufacture, as set forth.

5. The combination, with a wheel-rim, of a rubber tire having a continuous longitudinal hole and radial pockets, and spiral springs fitting in the said pockets and adapted to cushion radially, as set forth.

6. The combination, with a wheel-rim made of a partially-flat section, of a hollow rubber tire having radial pockets and a continuous re-enforcing strip of canvas, and spiral springs adapted to fit in the said pockets and cushion radially, as set forth.

7. The combination, with a wheel-rim, of a hollow rubber tire having radial pockets and a continuous re-enforcing strip of canvas, spiral springs adapted to fit in the said pockets and cushion radially, and the making-up strip in the bottom of the rim, as set forth.

8. The combination, with a wheel-rim, of a hollow elastic tire built up of two or more pieces of rubber on a strip of canvas and having radial pockets formed therein, and spiral springs fitting in the said pockets and adapted to cushion radially, as set forth.

9. The combination, with a wheel-rim, of a hollow rubber tire having radial pockets and a continuous re-enforcing strip of canvas, spiral springs adapted to fit in the said pockets and cushion radially, and washers or filling-up pieces adapted to close the open ends of the said pockets and present a flat bearing-surface to the spiral springs, as set forth.

STEPHEN J. ROSE.

Witnesses:
ROBT. ED. PHILLIPS,
FREDERICK G. BALL,
    *Both of 70 Chancery Lane.*